Sept. 30, 1941.                    C. L. MOTE                      2,257,510
                 DEVICE FOR OBSERVING THE AREA IN THE REAR OF VEHICLES
                                Filed Feb. 19, 1940
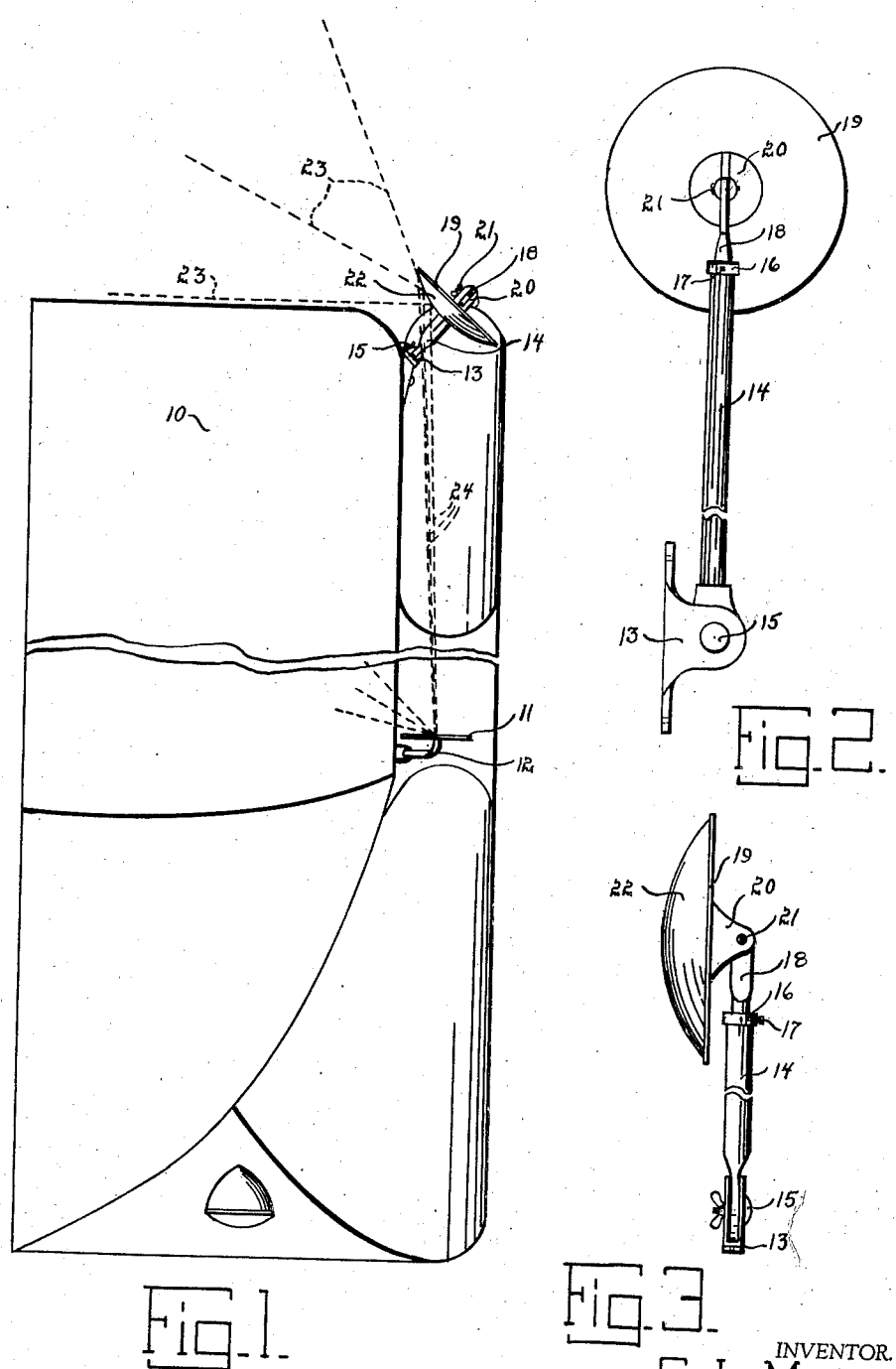
INVENTOR.
C. L. MOTE
BY M. Talbert Dick
ATTORNEY.

Patented Sept. 30, 1941

2,257,510

UNITED STATES PATENT OFFICE 2,257,510

DEVICE FOR OBSERVING THE AREA IN THE REAR OF VEHICLES

Charles L. Mote, Des Moines, Iowa

Application February 19, 1940, Serial No. 319,630

2 Claims. (Cl. 88—86)

The principal object of this invention is to provide a vision mirror for the back end of a delivery truck and the like that enables the driver to see the area immediately in back of the truck.

A further object of this invention is to provide a convex vision mirror for the rear end of a delivery truck and the like that enables the driver to see the area immediately in back of the truck without having to change his driving position.

A still further object of this invention is to provide a vision mirror for the rear end of a delivery truck and the like that may be used in conjunction with the ordinary outside vision mirror.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a top plan view of a portion of a delivery truck showing my mirror mounted on the rear end and being used in conjunction with the ordinary outside type vision mirror.

Fig. 2 is a rear view of my mirror showing the manner in which it is mounted.

Fig. 3 is a side view of my mirror and more fully illustrates its construction.

The usual method for a driver of a truck is to open the door and lean out as far as possible so as to see as much of the ground in back of the truck as his limited field of vision allows. As a result the driver is in an unnatural position to cope with emergencies. Even though the driver leans out as far as possible, his field of vision does not allow him to see the area immediately in back of the vehicle. This is dangerous inasmuch as children or pet animals may be in back of the truck in that field that is not visible to the driver. It is public knowledge that many children are injured every year because the driver of a delivery truck or like could not see all the area immediately surrounding the rear end of his truck. I have provided a means of overcoming these undesirable features as will be more fully explained hereinafter.

The numeral 10 designates the body portion of a delivery truck. The numeral 11 designates the usual type of outside vision mirror which is held in position by the bracket 12. These rear vision mirrors, as is well known, offer a clear view to the rear. The driver of the truck does not have to change his driving position to see the mirror. I use the numeral 13 to designate a bracket mounted on the rear end portion of the truck. The numeral 14 designates a hollow arm hingedly mounted in the bracket 13 and held in any desired position by the tightening nut 15 as shown in Fig. 3. This arm 14 extends from the bracket 13 and terminates within the collar 16. This collar 16 is held in position by the tightening nut 17 which also has a tendency to pinch the outer end of the arm 14 together as the outer end of this arm is split as shown in Fig. 3. The numeral 18 designates a second arm which has a portion of its inner end slidably and rotatably journaled inside of the arm 14. The outer end portion of this arm 18 supports the convex mirror retaining member 19, which is hingedly adjustably mounted thereon and held against movement at times by the lock nut 21. The numeral 22 designates the convex mirror mounted in the retaining member 19. As it will readily be seen from the above description, the convex mirror 22 may be moved either up or down or to the right or left, by loosening the bracket member 13, the collar 16 and the hinged member 20. The driver of the vehicle is in a position to observe the rear vision mirror 11 and the area to the rear, therefore by making the adjustments as set forth in the above explanation, the convex mirror may be brought into the field of vision of the mirror 11. The mirror 22 due to the fact that it is convex, picks up and reflects the area immediately in the rear of the vehicle 10. The area is then reflected from the convex mirror 22 to the rear vision mirror 11 as is shown by the lines 23 and 24. Thus it will readily be seen that the area immediately in the rear of the vehicle 10 is picked up by the convex mirror 22 and reflected to the mirror 11 which enables the driver to see the immediate rear of the truck without changing his driving position. The blind spot in back of a vehicle has been eliminated by my device and therefore the danger of running over children that might be in the rear of a vehicle backing up.

Some changes may be made in the construction and arrangement of my improved device for absorbing the area in the rear of a vehicle without departing from the real spirit and purpose of my invention, and it is my intention to cover by my claims any modified forms of structure or use of mechanical equivalents which may be reasonably included within their scope.

I claim:

1. In combination with a vehicle having an outside rear vision mirror mounted on its outside front portion and facing substantially rearwardly, a convex mirror mounted on the outside rear end corner of said vehicle at an angle to both the longitudinal and transverse axes of said vehicle with the convex face of said mirror extending inwardly and forwardly relative to the central area of said vehicle; said convex mirror being in line with said first mentioned mirror so as to reflect to the first mentioned mirror the area surrounding the immediate rear of said vehicle.

2. In combination with a vehicle having an outside rear vision mirror on its front portion, a bracket secured to a rear corner of said vehicle, a tubular element hingedly secured to said bracket, a means for preventing the movement of said tubular element relative to said bracket at times, a rod element rotatably mounted in the free end portion of said tubular element, a means for preventing the rotation of said rod element relative to said tubular element at times, a convex mirror hingedly secured to the outer free end portion of said rod element, and a means for preventing the movement of said convex mirror relative to said rod element at times.

CHARLES L. MOTE.